United States Patent
Shah et al.

(10) Patent No.: US 11,816,119 B2
(45) Date of Patent: *Nov. 14, 2023

(54) SYSTEM AND METHODS FOR QUERYING AND UPDATING DATABASES

(71) Applicant: ServiceNow, Inc., Santa Clara, CA (US)

(72) Inventors: Siddharth Rajendra Shah, Bellevue, WA (US); Jeremy Norris, Lakeside, CA (US); Olivier Baxa, Kirkland, WA (US); Josef Mart, San Francisco, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,419

(22) Filed: Nov. 3, 2022

(65) Prior Publication Data

US 2023/0086005 A1    Mar. 23, 2023

Related U.S. Application Data

(63) Continuation of application No. 16/784,982, filed on Feb. 7, 2020, now Pat. No. 11,514,066.

(Continued)

(51) Int. Cl.
*G06F 16/24* (2019.01)
*G06F 16/2458* (2019.01)
(Continued)

(52) U.S. Cl.
CPC ........ *G06F 16/2471* (2019.01); *G06F 16/214* (2019.01); *G06F 16/22* (2019.01);
(Continued)

(58) Field of Classification Search
CPC .... G06F 16/2471; G06F 16/214; G06F 16/22; G06F 16/221; G06F 16/24553; G06F 16/27

See application file for complete search history.

(56) References Cited

U.S. PATENT DOCUMENTS

| 8,510,261 B1 | 8/2013 | Samantray |
| 8,825,678 B2 | 9/2014 | Potapov et al. |

(Continued)

FOREIGN PATENT DOCUMENTS

| JP | 2013228999 A | 11/2013 |
| JP | 2013246835 A | 12/2013 |

OTHER PUBLICATIONS

D. Morooka, et al., OLTP/OLAP concurrency method considering access range in multi-core environments, 11th Forum on Data Engineering and Information Management, 17th Annual Conference of the Database Society of Japan, Mar. 6, 2019.

(Continued)

*Primary Examiner* — Merilyn P Nguyen
(74) *Attorney, Agent, or Firm* — FLETCHER YODER PC

(57) ABSTRACT

Systems and method for improving query performance by querying an appropriate database engine based on the operation of the query request is provided. In one aspect, this approach involves querying a row-oriented database, querying a column-oriented database, or blacklisting the query request. In particular, updating the column-oriented database involves delete and insert operations. By maintaining updated databases and querying appropriate database engines, the response time of a query request may be improved.

14 Claims, 4 Drawing Sheets

Related U.S. Application Data

(60) Provisional application No. 62/960,567, filed on Jan. 13, 2020, provisional application No. 62/932,931, filed on Nov. 8, 2019.

(51) Int. Cl.
  *G06F 16/21* (2019.01)
  *G06F 16/27* (2019.01)
  *G06F 16/22* (2019.01)
  *G06F 16/23* (2019.01)
  *G06F 16/2455* (2019.01)

(52) U.S. Cl.
  CPC ........ *G06F 16/221* (2019.01); *G06F 16/2379* (2019.01); *G06F 16/24553* (2019.01); *G06F 16/27* (2019.01)

(56) References Cited

U.S. PATENT DOCUMENTS

| | | | |
|---|---|---|---|
| 9,516,108 | B1 | 12/2016 | Sullivan et al. |
| 9,971,808 | B2* | 5/2018 | Kamath .............. G06F 16/2455 |
| 10,209,983 | B2 | 2/2019 | Norris |
| 10,512,053 | B2 | 12/2019 | Shah et al. |
| 10,860,562 | B1* | 12/2020 | Gupta ................. G06F 16/2453 |
| 10,909,114 | B1* | 2/2021 | Virtuoso ............. G06F 16/2282 |
| 11,126,597 | B2 | 9/2021 | Ormerod et al. |
| 2008/0281784 | A1 | 11/2008 | Zane et al. |
| 2013/0198168 | A1 | 8/2013 | Huang et al. |
| 2013/0226959 | A1 | 8/2013 | Dittrich et al. |
| 2013/0254242 | A1 | 9/2013 | Kashiwagi et al. |
| 2013/0275365 | A1* | 10/2013 | Wang ................... G06F 16/283 707/E17.014 |
| 2014/0095475 | A1 | 4/2014 | Su et al. |
| 2014/0129530 | A1 | 5/2014 | Raufman |
| 2015/0286683 | A1 | 10/2015 | Zhou |
| 2016/0078085 | A1* | 3/2016 | Hu ........................ G06F 16/273 707/765 |
| 2017/0139947 | A1* | 5/2017 | Abed .................... G06F 16/221 |
| 2017/0193058 | A1 | 7/2017 | Fung et al. |
| 2018/0307850 | A1 | 10/2018 | Norris |
| 2019/0097885 | A1 | 3/2019 | Baxa et al. |
| 2019/0104175 | A1* | 4/2019 | Balkesen ............ H04L 67/1046 |
| 2019/0147087 | A1 | 5/2019 | Mart et al. |
| 2019/0311051 | A1* | 10/2019 | Legler ................. G06F 16/2453 |
| 2020/0099512 | A1 | 3/2020 | Kikinis |
| 2020/0233841 | A1 | 7/2020 | Ormerod et al. |
| 2020/0233905 | A1* | 7/2020 | Williams .............. G06F 16/904 |
| 2020/0293532 | A1 | 9/2020 | Uzar et al. |
| 2020/0320138 | A1* | 10/2020 | Horn ................. G06F 16/24568 |
| 2021/0004792 | A1 | 1/2021 | Kikinis et al. |
| 2021/0073804 | A1 | 3/2021 | Kikinis |
| 2021/0124742 | A1 | 4/2021 | Ahmed et al. |
| 2021/0157812 | A1 | 5/2021 | Rumiantsau et al. |

OTHER PUBLICATIONS

Notice of Rejection for Japanese Patent Application No. 2022-526448, dated Sep. 5, 2023; 8 pgs.

* cited by examiner

SYSTEM AND METHODS FOR QUERYING AND UPDATING DATABASES

CROSS-REFERENCE TO RELATED APPLICATION

This application is a continuation of U.S. application Ser. No. 16/784,982, entitled "SYSTEM AND METHODS FOR QUERYING AND UPDATING DATABASES," filed Feb. 7, 2020, which issued as U.S. Pat. No. 11,514,066 on Nov. 29, 2022 and which claims priority from and the benefit of U.S. Provisional Application Ser. No. 62/932,931, entitled "SYSTEM AND METHODS FOR QUERYING AND UPDATING DATABASES," filed Nov. 8, 2019, and U.S. Provisional Application Ser. No. 62/960,567, entitled "SYSTEMS AND METHODS FOR PERFORMING UPDATED QUERY REQUESTS IN A SYSTEM OF MULTIPLE DATABASE ENGINE," filed Jan. 13, 2020, each of which is hereby incorporated by reference in its entirety for all purposes.

BACKGROUND

The present disclosure relates generally to systems and methods, for querying and updating databases. More specifically, the present disclosure is related to systems and methods for querying an appropriate database in response to receiving a particular query request.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). These resources may be provided and provisioned by one or more different providers with different settings or values.

Various types of data may be organized and stored in databases that are created, stored, and maintained on different types of computer-based systems. Examples of such databases include row-oriented databases and column-oriented databases. Such databases may be used to store data ranging from personal information or data developed in large-scale industrial, commercial, and governmental contexts. Thus, such stored data sets may range from the trivially small in size to those that may encompass tens of millions of records and data points, or more. As the number of records and the number of defined fields within a database grow in number, however, the limitations of a given database architecture may impact the capability of a given database to be used efficiently.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system, comprising, a row-oriented database comprising a first set of data entries; a column-oriented database comprising a second set of data entries; and a computing device comprising a processor configured to execute computer-executable instructions stored on a non-transitory computer-readable medium. The computer-executable instructions, when executed by the processing component, cause the processing component to perform actions that include at least: receiving a query request configured to identify one or more entries in the first set of data entries or the second set of data entries; determining whether the query request comprises performing a filtering operation to identify the one or more entries or performing an analysis operation to identify the one or more entries; querying the row-oriented database in response to the query request comprising the filtering operation; and querying the column-oriented database in response to the query request comprising the analysis operation.

In a further embodiment, a method for updating a column-oriented database comprising a set of data entries. In accordance with this method, an indication of a modification to one or more entries associated with the set of data is received via a processor. The one or more entries in the set of data entries in response to receiving the indication are identified, via the processor. The one or more entries of the set of data in the column-oriented database are deleted, via the processor. One or more delete data structures comprising the one or entries in a first reserve section of the column-oriented database are formed, via the processor. One or more updated entries in place of the one or more entries of the set of data in the column-oriented database are inserted, via the processor. The one or more delete data structures with an additional set of entries associated with one or more previously executed query requests are joined, via the processor. The one or more delete data structures and the additional set of entries from the first reserve are deleted, via the processor. One or more additional delete data structures associated with one or more additional modifications to at least a portion of the set of data entries in a second reserve section in the column-oriented database, wherein the second reserve section is different from the first reserve section, are generated, via the processor.

In an additional embodiment, a non-transitory computer-readable medium, comprising computer-executable instructions are provided. The computer-executable instructions, when executed by the processing component, cause the processing component to perform actions that include at least: receiving a query request directed to a column-oriented database; determining whether the query request corresponds to one of a predefined list of query requests; and querying a row-oriented database based on the query request in response to the query request corresponding to the one of a predefined list of query requests.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
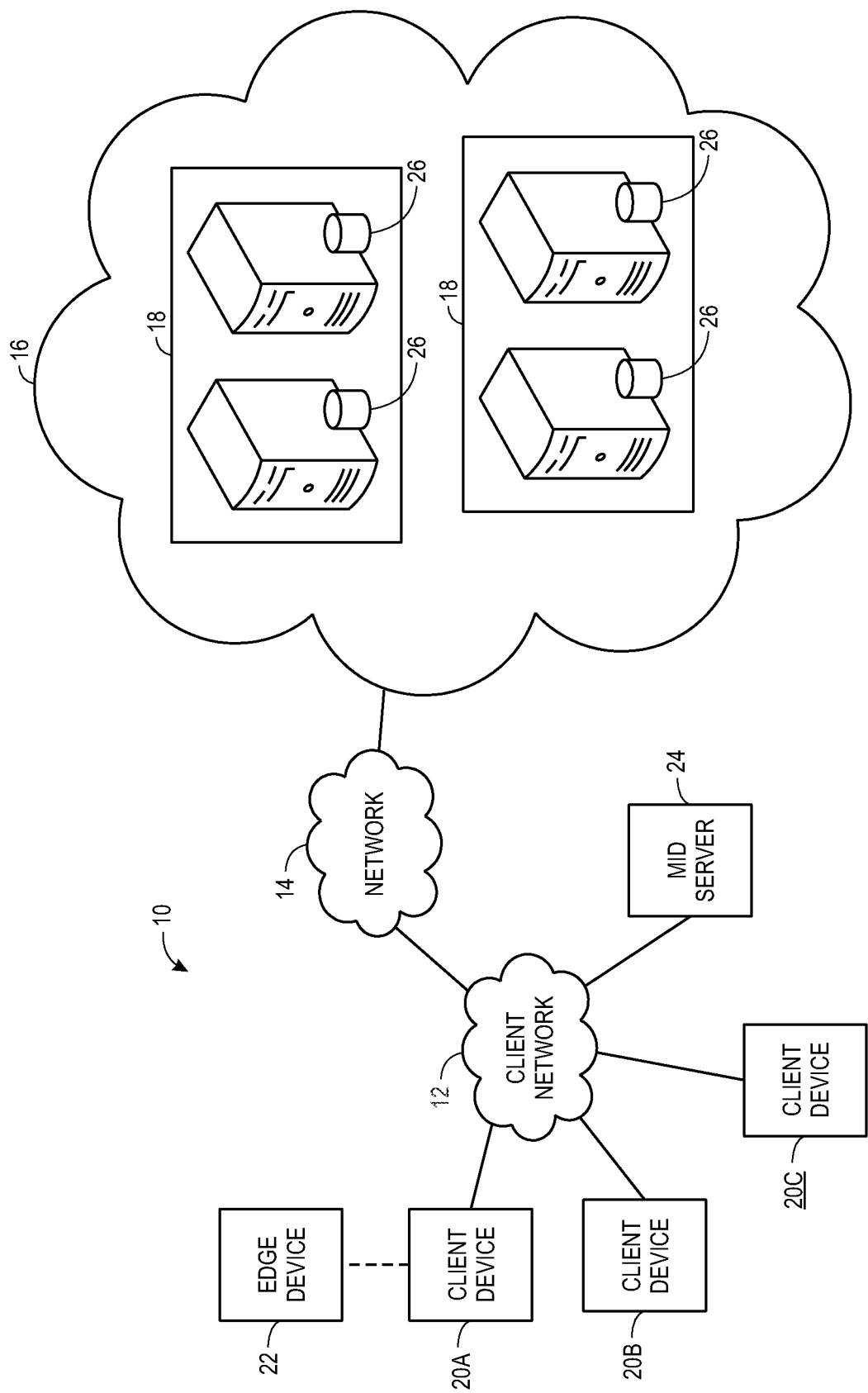
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As discussed in greater detail below, the present embodiments described herein improve efficiencies in performing queries on a database. Due to the growing amount of data, executing and responding to query requests continue to increase in time and complexity. As a result, directing query requests to appropriate database engines may provide efficiency in response times to query requests and may provide more useful analytical use cases. In one example, both a row-oriented database and a column-oriented database may contain a set of data entries. After a query request is received, a processor may determine whether the query request contains an analysis operation. If the query request contains an analysis operation, the processor may determine whether the column-oriented database has data entries related to the query request. If the column-oriented database does indeed contain data entries related to the query request, then the processor may send the query request to the column-oriented database for querying. If the column-oriented database does not contain data entries related to the query request, a replicator component may copy the relevant data entries from the row-oriented database to the column-oriented database before the processor sends the query request to the column-oriented database. On the other hand, if the query request does not contain an analysis operation, then the processor may send the query request to the row-oriented database.

Query requests that do not contain analysis operations may be sent to row-oriented databases due to how data is stored in a memory component (e.g. memory blocks) of the row-oriented database. Data blocks stored in the memory component of row-oriented databases include multiple types of data with respect to a column for one particular entity. With this in mind, updates to data blocks from a row-oriented database are relatively easier to implement compared to a column-oriented database. On the other hand, the processor may perform analysis operation more efficiently in column-oriented databases compared to row-oriented databases due to how data is stored in memory component of the column-oriented database. Data blocks stored in the memory component of column-oriented databases include multiple values for multiple entities, such that the multiple values are related to the same data type. As a result, since the data type of each column may be similar, performing analysis operations such as aggregating data within particular columns or queries involving executing certain algorithms on data stored in each column may be performed more efficiently, as compared to performing the same algorithms in data stored in different rows.

With this in mind, updating data entries in column-oriented databases may be relatively more difficult compared to row-oriented databases. For instance, when performing updates, which may be received as row-oriented cells, the processor may read through a certain number of rows in a row-oriented database to make the update. However, due to its column-oriented nature, to make the same update in a column-oriented database, the processor may read through a larger amount of columns as compared to the minimum number of rows before it may make the same row-oriented update as performed on row-oriented database. As such, updating column-oriented databases may be especially time consuming if the column-oriented database contains a large volume of data entries. To address the issue of updating a column-oriented database, the row with data entries to be updated may be deleted after receiving an indication that a modification to the data entries has been received. In place of the deleted row, a new row with the updated data entries may be inserted. Deleting the row forms separate delete data structures with the data that was previously stored in the deleted row. Within a first reserve section of the column-oriented database, these separate delete data structures are joined together with data entries associated with previously executed query requests (e.g., updates, modifications). The separate delete data structures of the first reserve section may be permanently deleted on a periodic basis (e.g., daily, monthly), such that the first reserve section no longer includes the separate delete data structures after the delete operation is performed. After the separate delete data structures are deleted, new query requests may be directed to a second reserve section of the column-oriented database. In this way, the separate delete data structures are maintained in such a manner that reserve sections of the column-oriented database are efficiently utilized and additional sections of the column-oriented database are available for data storage and query operations.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center 18 could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

Although FIG. 1 illustrates specific embodiments of a cloud computing system 10, the disclosure is not limited to the specific embodiments illustrated in FIG. 1. For instance, although FIG. 1 illustrates that the platform 16 is implemented using data centers, other embodiments of the platform 16 are not limited to data centers and can utilize other types of remote network infrastructures. The use and discussion of FIG. 1 are only examples to facilitate ease of description and explanation and are not intended to limit the disclosure to the specific examples illustrated therein.

As may be appreciated, the respective architectures and frameworks discussed with respect to FIG. 1 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 2:
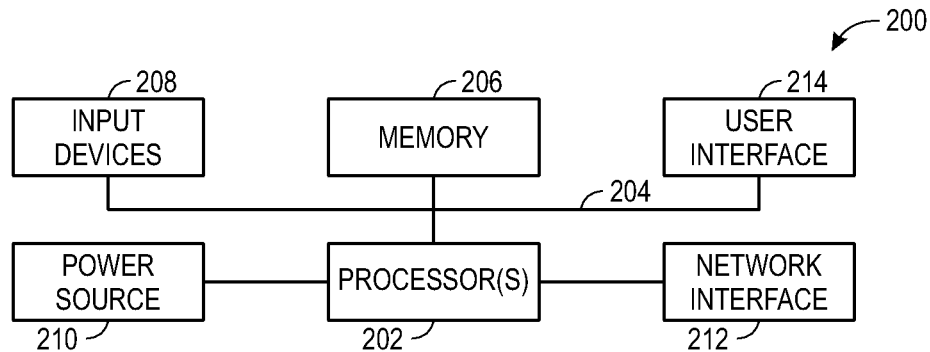
FIG. 2 is a block diagram of a computing device utilized in a computing system that may be present in FIG. 1, in accordance with aspects of the present disclosure.

By way of background, it may be appreciated that the present approach may be implemented using one or more processor-based systems such as shown in FIG. 2. Likewise, applications and/or databases utilized in the present approach may be stored, employed, and/or maintained on such processor-based systems. As may be appreciated, such systems as shown in FIG. 2 may be present in a distributed computing environment, a networked environment, or other multi-computer platform or architecture. Likewise, systems such as that shown in FIG. 2, may be used in supporting or communicating with one or more virtual environments or computational instances on which the present approach may be implemented.

With this in mind, an example computer system may include some or all of the computer components depicted in FIG. 2, which generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 3:
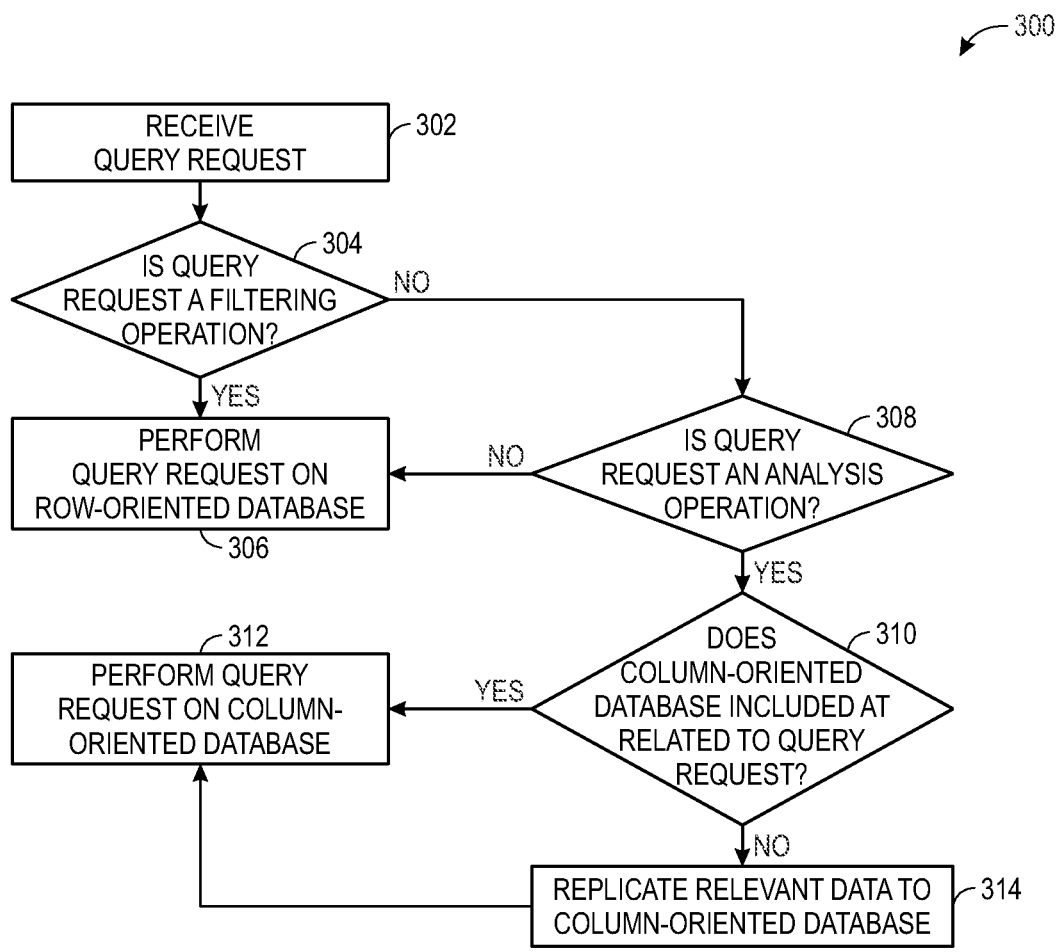
FIG. 3 is a flow chart of a process used to determine a database engine for performing a query request, in accordance with aspects of the present disclosure.

With this in mind, to improve efficiency in responding to query requests, the computing system 200, as discussed in FIG. 2, may perform a query request on a particular database based on a type of operation being performed by the query request. Hence, FIG. 3 is a flow chart of a process 300 by which the computing system 200 may select a particular database for performing a query request. Before proceeding, it should be noted that the process 300 serves as a non-limiting example associated with routing query requests based on the type of operation being performed by the query request. That is, the process 300 may be an example of a default routing method when limited knowledge associated with performing the query request on an optimal database may be available. On a periodic basis, after the computing system 200 performs the query request on a particular database (e.g., the row-oriented database) based on the process 300, the computing system 200 may perform the same query request on an alternative database (e.g., the column-oriented database) to gain information about performing the query request on more than one database engines. Based on analyzing information regarding performing query requests on different database engines, the computing system 200 may perform subsequent query requests on a particular database based on the determining the optimal database (e.g., time efficient, quickest results, computationally efficient) for performing the query requests.

The process 300 begins as the computing system 200 receives a query request from a client server (block 302). Operations of query requests may vary in complexity and response time (i.e., the amount of time it takes for query requests to be performed). Response time for queries may also vary depending on different types of databases. Examples query requests may include, but are not limited to, aggregating data in a table format, analyzing data to render a report, or filtering data in an ad-hoc manner to identify a data entry and a corresponding line. Query requests may be received periodically from the client server or any other suitable computing device.

As query requests are received by the computing system 200, the computing system 200 may determine a type of operation of the query request may be determined. For instance, at block 304, the computing system 200 whether the query request includes a filtering operation (block 304). If the query request includes the filtering operation, the computing system 200 may proceed to block 306 and send the query request to a row-oriented database, in which data entries are organized and stored in a row format (block 306). In some embodiments, a row-oriented database may store data according to each row in adjacent memory block. As a result, read and write operations may be performed efficiently for records stored in a row-oriented database due to the organization of the data corresponding to data stored in the memory blocks. By way of example, row-oriented databases may be used to perform a filtering operation, which allows for identifying records or data entries that match particular criteria. In one embodiment, a filtering operation may include reading through rows to identify a value associated with a particular data entry in the row-oriented database. In another embodiment, a filtering operation may include replacing the value of a data entry with another value.

Referring back to block 304, if the query request is not a filtering operation, then the computing system 200 may proceed to block 308. At block 308, the computing system 200 may determine if the query request includes an analysis operation. If the query request includes the analysis operation, the computing system 200 may proceed to block 310. At block 310, the computing system 200 may determine if the column-oriented database includes data related to the query request. If the column-oriented database includes the requested data, the computing system 200 may, at block 312, may send, the query request to the column-oriented database to perform the operation indicated by the query request. The column-oriented database may include data entries organized and stored in a column format. In some embodiments, the column-oriented database may organize store data according to their arrangement or order in a column in adjacent memory blocks. As such, certain types of analytical processing may be performed more efficiently as compared to using a row-oriented database. Although read and write operations may be slower in a column-oriented database compared to a row-oriented database, the column-oriented database may be well-suited for performing operations applicable to entire datasets, such as analysis operations. For example, analysis operations may involve aggregation over a number of rows and columns. Examples of analysis operations may include aggregating data entries into a list, a table, or a group, rending a report from the data entries and the line.

Referring back to block 310, if the column-oriented database does not include the data related to the query request, the computing system 200 may proceed to block 314 and send the query request to a replicator component. In some embodiments, the replicator component may be deployed as a service on the same server where the column-oriented database is deployed. The replicator component may have access via a source credential to an initial database and a target credential to a target database. In one embodiment, the initial database may be a row-oriented database while the target database may be a column-oriented database. By way of example, the replicator component may have permission to read the query request and data entries from the initial database and copy the data entries to the target database in a column-oriented format. After relevant data entries related to the query request has been copied from the initial to the target database, the query request may be sent to the target database (e.g. the column-oriented database).

Figure 4:
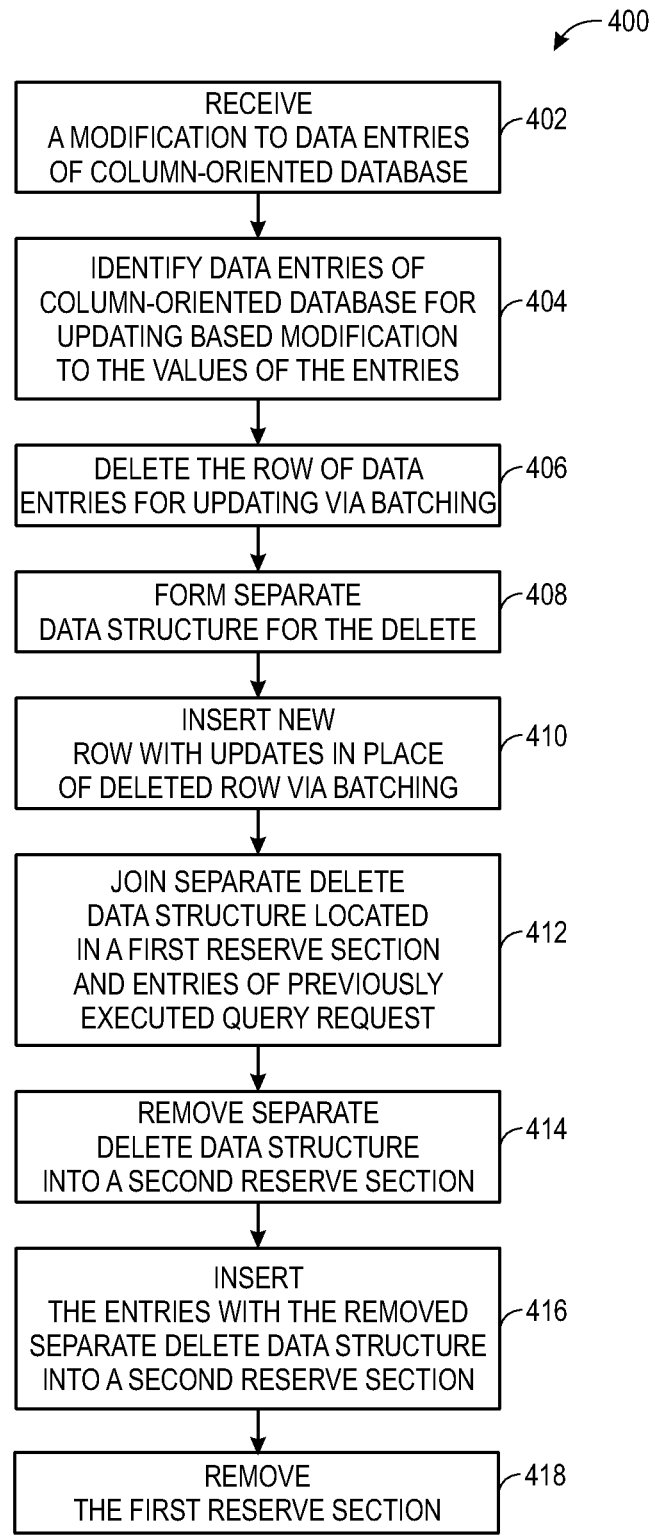
FIG. 4 is a flow chart of a process used to update a column-oriented database, in accordance with aspects of the present disclosure.

As discussed above, after the computing system 200 receives a query request, the computing system 200 may determine the type of operation of the query request. If the query request involves updating a column-oriented database, then the computing system 200 perform process 400. FIG. 4, a flowchart of process 400, illustrates in greater detail how the computing system 200 updates the column-oriented database. The process 400 begins as the computing system 200 receives an indication of a modification to one or more data entries of a column-oriented database (block 402). The modification may entail an update or a change in value or line to the one or more data entries of the column-oriented database. Based on the indication of the modification to the values of the one or more data entries, the computing system 200 may identify particular data entries of the column-oriented database that are to be updated (block 404). In some embodiments, the modification may be related to an insert, delete, or update operation performed on the one or more data entries. Examples of modifications may include causing updates to different tables, automatically generating or transforming values or the line for the data entries to be updated or invoking functions to perform tasks such as issuing alerts.

After the one or more data entries that are to be updated are identified, the computing system 200 may delete the row with the data entries to be updated via batching after receiving an indication that a modification to the data entries has been received (block 406). Batching may include a process that includes collecting and storing data for processing at a scheduled time, when a threshold amount of data has been accumulated rather than processing each data entry one at a time. In an embodiment, a series of query requests or jobs may be executed on a computer with minimal manual intervention as a result of batching techniques. Additionally, batching may allow for query requests or jobs to be processed at a scheduled time when computing resources are expected to be used less frequently or have a low amount of jobs to process compared to an average amount of jobs that the database is expected to process over a period of time. By way of example, batch processing may involve report generation and data format conversion.

As mentioned above, column-oriented databases may not efficiently perform read and write operations. However, due to its column-oriented nature, to perform a read or write operation, the column-oriented database, the computing system 200 may read through a number of memory blocks before it may make an equivalent row-oriented update. This process can be especially time consuming if the column-oriented database contains a large volume of data entries. Instead, to implement updates more efficiently, the computing system 200 may delete the row of memory block associated with data entries that are to be updated from the memory blocks, and the computing system 200 may, at block 406, replace the memory blocks with a new row consisting of the updated data entries.

After performing a delete operation to delete the row with the data entries to be updated, the computing system 200 may form one or more separate delete data structures (block 408). These separate delete data structures may represent data that was previously stored in the deleted row and may be located in a first reserve section of a memory component (e.g. memory blocks) of the column-oriented database. In place of the deleted row, the computing system 200 may insert a new row with the updated data entries or data entries that have changed in value via batching (block 410). Afterwards, within the first reserve section, the computing system 200 may join the separate delete data structures together with data entries associated with previously executed query requests (e.g., updates, modifications) (block 412).

At block 414, the computing system 200 may permanently delete the separate delete data structures of the first reserve section on a periodic basis (e.g., monthly, daily), such that the first reserve section no longer includes the separate delete data structures after the delete operation is performed. After the separate delete data structures are deleted, the computing system 200 may direct query requests to a second reserve section of the column-oriented database (block 416). Henceforth, the computing system 200 may direct data entries of new query requests to the second reserve section while the computing system 200 permanently removes the first reserve section from the memory component (block 418). In this way, the separate delete data structures are maintained in such a manner that reserve sections of the column-oriented database are efficiently utilized and additional sections of the column-oriented database are available for data storage and query operations.

As described above, query requests containing analysis operations may be directed towards a column-oriented database. However, in some instances, query requests directed for the column-oriented database may be re-routed to a row-oriented database or may be blacklisted. If the query request is a part of a predefined list of blacklist requests, then the query request may be sent to a row-oriented database. The predefined list of blacklist requests may include date trend requests, time trend requests, point queries, large field projections, or any combination thereof. If a response time of the query request in a row-oriented database is not less than a threshold amount of time X, the query may be performed on the column-oriented database. However, if the query fails on the column-oriented database due to problems such as syntax error or timeout, then it may be blacklisted or re-routed to the row-oriented database. Blacklisting a query request or re-routing the query request to the row-oriented database may also involve determining that a response time of the query request performed on the column-oriented database is greater than a threshold amount of time Y. Another example of blacklisting a query request or re-routing the query request to the row-oriented database may involve the response time of the query request performed on the column-oriented database plus a threshold amount of time Z being greater that the response time of the query request performed on the row-oriented database. Blacklisted query requests may also be re-evaluated again periodically. If the blacklisting is not valid, the blacklisted query request may be unblacklisted.

Figure 5:
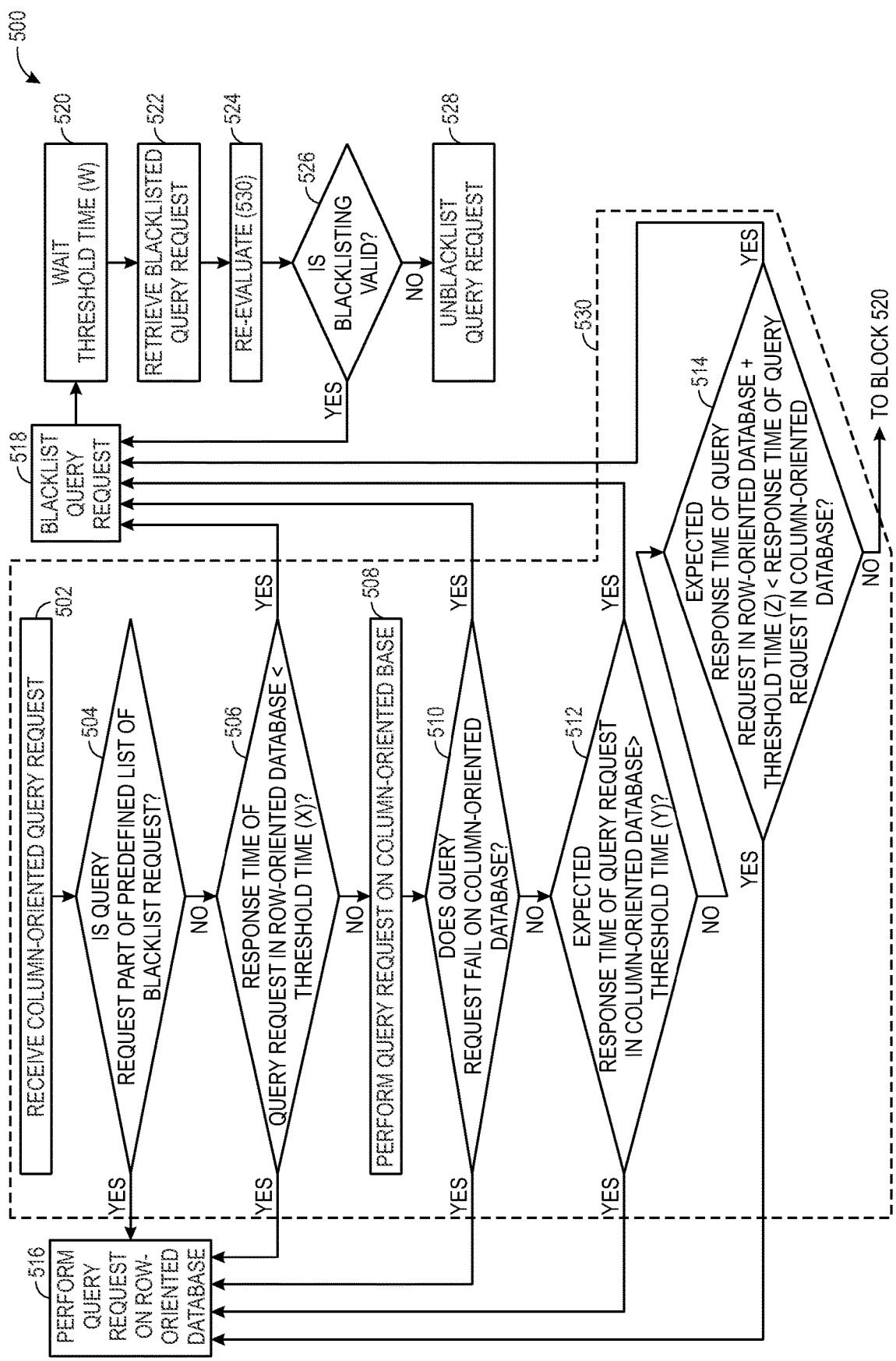
FIG. 5 is a flow chart of a process used to assess the validity of a query request, in accordance with aspects of the present disclosure.

The process by which the computing system 200 may blacklist a query request intended to be performed on a column-oriented database is illustrated in FIG. 5. By way of example, FIG. 5 is a flowchart of process 500 that the computing system 200 may employ to determine whether a column-oriented query request may be blacklisted and thus ignored or re-routed to a row-oriented database. The process 500 begins as the computing system 200 receives a column-oriented query request (block 502). As mentioned in FIG. 3, column-oriented query requests may include analysis operations, which may involve aggregating or grouping data.

The computing system 200 may follow the steps within process 530 to determine whether the query request will be transmitted to a row-oriented database (block 516) and whether the query request will be blacklisted (block 518). Blacklisting is a mechanism that controls which elements (e.g. query requests) are allowed access to a computing entity (e.g. database). For instance, certain query requests that the computing system 200 deems for blacklisting may be denied access to particular databases. At block 504, the computing system 200 may determine whether the query request is a part of a predefined list of blacklist requests (block 504). The predefined list of blacklist request may include date trend requests, time trend requests, point queries, large field projections, or any combination thereof. In one embodiment, performing a point query may provide analysis for a single data entry in a database, while a large field projection may control which fields of the database may be displayed in response to the query request. If the query request is a part of the predefined list of blacklist requests, the computing system 200 may send the query request the row-oriented database (block 516), which may be better suited for the operations that are a part of the predefined list.

If the query request is not a part of the predefined list, the computing system 200 may then determines if the response time for performing the query request in a row-oriented database is less than a threshold amount of time X (block 506). In some embodiments, the threshold amount of time X may be configurable and set to 100 milliseconds, 1 second, 10 seconds, or any suitable time periods. If the response time for performing the query request in the row-oriented database is expected to be greater than the threshold amount of time X, then the computing system 200 may blacklist the query request (block 518) by updating the predefined list of query requests to include the query request in response to the expected response time being less than the threshold amount of time X. In another instance, the computing system 200 may query the row-oriented database (block 516) based on the expected response time of the query request being less than the threshold amount of time X.

Otherwise, if the response time for performing the query request in the row-oriented database is expected to be less than the threshold amount of time X, the computing system 200 may proceed to block 508 and perform the query request on the column-oriented database. As a result, the computing system 200 may check whether the query request fails on the column-oriented database (block 510). If the query request indeed fails on the column-oriented database, the computing system 200 may blacklist the query request (block 518) by updating the predefined list of query requests to include the query request in response to the query request failing on the column-oriented database. In another embodiment, the computing system 200 may query the row-oriented database (block 516) based on the query request failing on the column-oriented database. In one embodiment, a query request may fail on a column-oriented database due to a syntax error or a timeout. For example, incorrectly placing a character in an operation may result in a syntax error, thereby preventing the query request from executing. In another example, a server may timeout waiting for the query request to execute.

If the query request does not fail on a column-oriented database at block 510, the computing system 200 may determine whether the query request meets the conditions of block 512 and block 514. At block 512, if an expected response time of the query request in the column-oriented database is greater than a threshold amount of time Y, the computing system 200 may blacklist the query request (block 518) by updating the predefined list of query requests to include the query request in response to the expected response time of the query request being greater than the threshold amount of time Y. For instance, the computing system 200 may query the row-oriented database (block 516) based on the expected response time of the query request being greater than the threshold amount of time Y.

If the expected response time of the query request in the column-oriented database is less than the threshold amount of time Y, the computing system 200 proceeds to block 514. At block 514, if the expected response time of the query request on the column-oriented database is greater than the response time of the query request on the row-oriented database by a threshold amount of time Z, then the computing system 200 blacklists the query request (block 518) by updating the predefined list of query requests to include the query request in response to the expected response time plus the threshold amount of time Z being greater than the response time of the query request in the row-oriented database. In another instance, the computing system 200 may query the row-oriented database (block 516) based on the expected response time plus the threshold amount of time Z being greater than the response time of the query request in the row-oriented database.

Both threshold amounts of time Y and Z may be configurable, and set to 2 seconds, 5 seconds, or any suitable time period. The expected response time of the query request in the column-oriented database may be calculated based on a model or simulation of query requests implemented on the column-oriented database. An average response time calculated based on the simulation may be set as the expected response time. Similarly, the expected response time of the query request in a row-oriented database may be calculated based on a model or simulation of query requests implemented on the row-oriented database.

In one example, if the computing system 200 has not executed the query request on a row-oriented database, and the processor lacks data associated with the query request performed on the row-oriented database, the query request may be blacklisted. Afterwards, the computing system 200 may send the now blacklisted query request to the row-oriented database to retrieve relevant data before performing process 530.

Otherwise, if the expected response time of the query request on the column-oriented database is less than the response time of the query request in the row-oriented database by the threshold amount of time Z, the computing system 200 may wait a threshold amount of time W (block 520). The threshold amount of time W may be configurable and set to 24 hours or any suitable time period. After waiting the threshold amount of time W, the computing system 200 may retrieve the blacklisted query requests (block 522) to re-evaluate the blacklisted query requests. In some instances, the computing system 200 may retrieve the most recently blacklisted query request to re-evaluate. In another example, the computing system 200 may retrieve the query requests that have been blacklisted twice or at least more than once to re-evaluate. The computing system 200 may even retrieve a query request that is a combination of having been most recently blacklisted and having been blacklisted more than once. The computing system 200 may re-evaluate the blacklisted query request based on the steps within process 530 (block 524). At block 526, the computing system 200 determines whether the decision to blacklist the query request was valid. If the blacklisting is not valid, then the blacklisted query request may be unblacklisted (block 528). Otherwise, if the blacklisting is valid, the blacklisted query request may be ignored and remain blacklisted (block 518). In some examples, if a blip, error, or bug in the backend of computing system 200 results in an unintended blacklisting, the computing system 200 may unblacklist the blacklisted query request.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
   receiving a query request associated with a set of data entries;
   in accordance with a determination that the query request corresponds to a filtering operation configured to identify one or more data entries of the set of data entries that match a particular criteria defined by the query request, querying a row-oriented database based on the query request; and
   in accordance with a determination that the query request corresponds to an analysis operation that comprises executing one or more algorithms on the set of data entries, querying a column-oriented database based on the query request.

2. The method of claim 1, wherein the filtering operation comprises identifying the set of data entries in the row-oriented database.

3. The method of claim 1, wherein the filtering operation comprises replacing one or more values associated with the set of data entries in the row-oriented database.

4. The method of claim 1, wherein the analysis operation comprises aggregating one or more data entries associated with the set of data entries in the column-oriented database.

5. The method of claim 4, comprising generating a report based on a result of the aggregating.

6. The method of claim 4, wherein the aggregating comprises executing one or more algorithms on the one or more data entries associated with the set of data entries in the column-oriented database.

7. The method of claim 1, comprising:
   sending the query request to a replicator component in response to detecting an absence of one or more entries of the set of data entries in the column-oriented database, wherein the replicator component is configured to copy the one or more entries of the set of data entries from the row-oriented database to the column-oriented database in response to receiving the query request.

8. The method of claim 1, comprising:
   querying the column-oriented database after querying the row-oriented database in response to the query request comprising the filtering operation;
   analyzing a first performance of the query request for the row-oriented database and a second performance of the query request for the column-oriented database; and
   performing a subsequent query request comprising the filtering operation on the row-oriented database or the column-oriented database based on the first performance and the second performance.

9. The method of claim 1, comprising:
   querying the row-oriented database after querying the column-oriented database in response to the query request comprising the analysis operation;
   analyzing a first performance of the query request for the row-oriented database and a second performance of the query request for the column-oriented database; and
   performing a subsequent query request comprising the analysis operation on the row-oriented database or the column-oriented database based on the first performance and the second performance.

10. A system comprising:

a processor; and a memory, accessible by the processor, storing instructions that, when executed by the processor, cause the processor to perform operations comprising:

receiving a query request associated with a set of data entries;

in accordance with a determination that the query request corresponds to a filtering operation configured to identify one or more data entries of the set of data entries that match a particular criteria defined by the query request, querying a row-oriented database based on the query request; and in accordance with a determination that the query request corresponds to an analysis operation that comprises executing one or more algorithms on the set of data entries, querying a column-oriented database based on the query request.

11. The system of claim 10, wherein the filtering operation comprises identifying the set of data entries in the row-oriented database.

12. The system of claim 10, wherein the first memory operation filtering operation comprises replacing one or more values associated with the set of data entries in the row-oriented database.

13. The system of claim 10, wherein the analysis operation comprises aggregating one or more data entries associated with the set of data entries in the column-oriented database.

14. A tangible, non-transitory computer readable storage media storing instructions that, when executed by one or more processors, cause the one or more processors to perform operations comprising:

receiving a query request associated with a set of data entries;

in accordance with a determination that the query request corresponds to a filtering operation configured to identify one or more data entries of the set of data entries that match a particular criteria defined by the query request, querying a row-oriented database based on the query request; and in accordance with a determination that the query request corresponds to an analysis operation that comprises executing one or more algorithms on the set of data entries, querying a column-oriented database based on the query request.

\* \* \* \* \*

UNITED STATES PATENT AND TRADEMARK OFFICE
CERTIFICATE OF CORRECTION

| | |
|---|---|
| PATENT NO. | : 11,816,119 B2 |
| APPLICATION NO. | : 18/052419 |
| DATED | : November 14, 2023 |
| INVENTOR(S) | : Siddharth Rajendra Shah et al. |

It is certified that error appears in the above-identified patent and that said Letters Patent is hereby corrected as shown below:

In the Claims

Column 16, Claim 12 Lines 1-2, please remove "first memory operation".

Signed and Sealed this
Thirtieth Day of April, 2024

*Katherine Kelly Vidal*

Katherine Kelly Vidal
*Director of the United States Patent and Trademark Office*